United States Patent
Sohum et al.

(10) Patent No.: US 12,406,280 B2
(45) Date of Patent: Sep. 2, 2025

(54) METHOD AND SYSTEM FOR HARDWARE AND SOFTWARE BASED USER IDENTIFICATION FOR ADVERTISEMENT FRAUD DETECTION

(71) Applicant: Affle (India) Limited, Mumbai (IN)

(72) Inventors: Anuj Khanna Sohum, Singapore (SG); Charles Yong Jien Foong, Singapore (SG); Anurag Singh, Gurgaon (IN)

(73) Assignee: Affle (India) Limited, Mumbai (IN)

( * ) Notice: Subject to any disclaimer, the term of this patent is extended or adjusted under 35 U.S.C. 154(b) by 15 days.

(21) Appl. No.: 16/399,747

(22) Filed: Apr. 30, 2019

(65) Prior Publication Data

US 2019/0333102 A1    Oct. 31, 2019

(30) Foreign Application Priority Data

Apr. 30, 2018   (IN) .............................. 201821016233

(51) Int. Cl.
*G06Q 30/0241* (2023.01)
*G06N 7/01* (2023.01)

(52) U.S. Cl.
CPC .......... *G06Q 30/0248* (2013.01); *G06N 7/01* (2023.01); *G06Q 30/0277* (2013.01)

(58) Field of Classification Search
CPC . G06Q 30/0248; G06Q 30/0277; G06N 7/005
See application file for complete search history.

(56) References Cited

U.S. PATENT DOCUMENTS

| 4,674,041 A | 6/1987 | Lemon et al. |
| 7,657,626 B1 | 2/2010 | Zwicky |
| 8,561,184 B1 | 10/2013 | Marsa et al. |

(Continued)

FOREIGN PATENT DOCUMENTS

| WO | 03102738 A2 | 12/2003 |
| WO | 2008030670 A1 | 3/2008 |
| WO | 2009020976 A1 | 2/2009 |

OTHER PUBLICATIONS

Wenhao Li, Haibo Li, Haibo Chen, Yubin Xia, Secure Online Mobile Advertisement Attestation Using TrustZone, Institute of Parallel and Distributed Systems Shanghai Jiao Tong University (Year: 2015).*

(Continued)

*Primary Examiner* — Errol Carvalho
(74) *Attorney, Agent, or Firm* — Kolisch Hartwell, P.C.

(57) ABSTRACT

The present disclosure provides a system for detection of online advertisement fraud and commerce fraud. The system includes a first step of collecting a first set of data from a plurality of components associated with each device of a plurality of devices and receiving a second set of data associated with each device of a plurality of third party devices. The system includes yet another step of calculating a probabilistic score for detection of the online advertisement and the commerce fraud in real-time. The system includes yet another step of analyzing the first set of data and the second set of data after a periodic interval of time. The system includes another step of detecting the online advertisement fraud and commerce fraud based on the analysis of the first set of data and the second set of data.

16 Claims, 4 Drawing Sheets

(56) References Cited

U.S. PATENT DOCUMENTS

| | | | |
|---|---|---|---|
| 8,745,154 B1* | 6/2014 | Froment | H04L 67/306 709/217 |
| 8,745,194 B2 | 6/2014 | Uribe-Etxebarria Jimenez | |
| 9,847,999 B2 | 12/2017 | Van Os et al. | |
| 9,852,427 B2 | 12/2017 | Caldera | |
| 10,009,358 B1 | 6/2018 | Xie et al. | |
| 10,110,616 B1 | 10/2018 | Xie et al. | |
| 10,183,231 B1 | 1/2019 | Lowe | |
| 10,334,054 B2 | 6/2019 | Van Os et al. | |
| 10,346,277 B2 | 7/2019 | Mermoud et al. | |
| 10,395,018 B2 | 8/2019 | Turgeman | |
| 10,491,614 B2 | 11/2019 | Grill et al. | |
| 10,496,808 B2 | 12/2019 | Van Os et al. | |
| 10,681,060 B2 | 6/2020 | Scheidler et al. | |
| 10,915,358 B2 | 2/2021 | Miry | |
| 10,929,879 B2 | 2/2021 | Cheng et al. | |
| 11,151,605 B2 | 10/2021 | Sohum et al. | |
| 11,157,952 B2 | 10/2021 | Sohum et al. | |
| 11,803,875 B2 | 10/2023 | Sohum et al. | |
| 2003/0220860 A1 | 11/2003 | Heytens et al. | |
| 2005/0278542 A1* | 12/2005 | Pierson | H04L 63/0876 713/182 |
| 2006/0136294 A1 | 6/2006 | Linden et al. | |
| 2007/0097096 A1* | 5/2007 | Rosenberg | G06F 1/1626 345/173 |
| 2007/0129999 A1* | 6/2007 | Zhou | G06Q 30/0273 705/14.69 |
| 2007/0240217 A1 | 10/2007 | Tuvell et al. | |
| 2007/0255821 A1 | 11/2007 | Ge et al. | |
| 2008/0052278 A1 | 2/2008 | Zlotin et al. | |
| 2008/0103955 A1 | 5/2008 | Flake et al. | |
| 2008/0215725 A1 | 9/2008 | Backer et al. | |
| 2011/0161492 A1 | 6/2011 | Granville | |
| 2012/0084146 A1 | 4/2012 | Zwicky | |
| 2012/0166285 A1 | 6/2012 | Shapiro et al. | |
| 2012/0221955 A1 | 8/2012 | Raleigh et al. | |
| 2013/0141396 A1* | 6/2013 | Lynn | G06F 3/0488 345/173 |
| 2013/0204993 A1 | 8/2013 | Uribe-Etxebarria Jimenez | |
| 2013/0226692 A1 | 8/2013 | Kouladjie et al. | |
| 2013/0325591 A1 | 12/2013 | Delug | |
| 2013/0346202 A1 | 12/2013 | Kouladjie et al. | |
| 2014/0156390 A1 | 6/2014 | Aaron et al. | |
| 2014/0358671 A1 | 12/2014 | Wei | |
| 2014/0358678 A1 | 12/2014 | Raab et al. | |
| 2015/0051970 A1 | 2/2015 | Stafford, Jr. et al. | |
| 2015/0142689 A1 | 5/2015 | Squires | |
| 2015/0143456 A1 | 5/2015 | Raleigh et al. | |
| 2015/0178567 A1 | 6/2015 | Baek et al. | |
| 2015/0213246 A1 | 7/2015 | Turgeman et al. | |
| 2015/0262226 A1 | 9/2015 | Howe | |
| 2015/0264068 A1* | 9/2015 | Beauchesne | H04L 63/1416 726/23 |
| 2015/0309610 A1* | 10/2015 | Rabii | G06F 3/041662 345/174 |
| 2015/0339705 A1* | 11/2015 | Raji | G06F 21/60 705/14.47 |
| 2015/0339721 A1 | 11/2015 | Raji et al. | |
| 2015/0350149 A1 | 12/2015 | Acharya et al. | |
| 2015/0378465 A1* | 12/2015 | Shih | G06F 3/041661 345/174 |
| 2016/0094573 A1 | 3/2016 | Sood et al. | |
| 2016/0112475 A1 | 4/2016 | Lawson et al. | |
| 2016/0119320 A1 | 4/2016 | Bansal et al. | |
| 2016/0132139 A1* | 5/2016 | Du | G06F 3/0414 345/173 |
| 2016/0173944 A1* | 6/2016 | Kilar | G06F 3/04886 725/12 |
| 2016/0239342 A1 | 8/2016 | Miry | |
| 2016/0283975 A1 | 9/2016 | Kaul et al. | |
| 2017/0032114 A1 | 2/2017 | Turgeman | |
| 2017/0063911 A1* | 3/2017 | Muddu | G06F 40/134 |
| 2017/0085587 A1 | 3/2017 | Turgeman | |
| 2017/0178072 A1 | 6/2017 | Poornachandran et al. | |
| 2017/0187751 A1 | 6/2017 | Andrews et al. | |
| 2017/0195353 A1 | 7/2017 | Taylor et al. | |
| 2017/0236330 A1 | 8/2017 | Seif | |
| 2017/0243028 A1 | 8/2017 | LaFever et al. | |
| 2017/0287014 A1 | 10/2017 | Vu et al. | |
| 2017/0308909 A1 | 10/2017 | Faith et al. | |
| 2017/0359306 A1 | 12/2017 | Thomas et al. | |
| 2018/0020002 A1 | 1/2018 | Duca et al. | |
| 2018/0041899 A1 | 2/2018 | Richards et al. | |
| 2018/0108016 A1 | 4/2018 | Jin et al. | |
| 2018/0160309 A1 | 6/2018 | Turgeman et al. | |
| 2018/0253212 A1* | 9/2018 | Oliver | G06F 3/04883 |
| 2018/0276709 A1 | 9/2018 | Li et al. | |
| 2018/0292890 A1 | 10/2018 | Swanson et al. | |
| 2018/0316722 A1 | 11/2018 | Jenson | |
| 2018/0332058 A1 | 11/2018 | Maxwell et al. | |
| 2018/0337936 A1 | 11/2018 | Mehrotra et al. | |
| 2018/0351786 A1 | 12/2018 | Pope et al. | |
| 2018/0359280 A1 | 12/2018 | Elworthy | |
| 2019/0057009 A1 | 2/2019 | Wang et al. | |
| 2019/0098004 A1 | 3/2019 | Mars et al. | |
| 2019/0130440 A1 | 5/2019 | Qiu et al. | |
| 2019/0220863 A1 | 7/2019 | Novick et al. | |
| 2019/0268302 A1 | 8/2019 | McDonald | |
| 2019/0333098 A1 | 10/2019 | Sohum et al. | |
| 2019/0333099 A1 | 10/2019 | Sohum et al. | |
| 2019/0333101 A1 | 10/2019 | Sohum et al. | |
| 2019/0333103 A1 | 10/2019 | Sohum et al. | |
| 2020/0403992 A1 | 12/2020 | Huffman et al. | |

OTHER PUBLICATIONS

M. Sree Vani, R. Bhramaramba, D. Vasumati, O. Yaswanth Babu, TUI based touch-spam detection in mobile applications to increase the security from advertisement networks, Jan. 2014, International Journal of Advanced Computer Communications and Control, vol. 02, No. 01 (Year: 2014).*

Dong, Feng et al., "FraudDroid: Automated Ad Fraud Detection for Android Apps", Conference '17, Jul. 2017, 12 pages.

Mamais, Stylianos S. et al., "Behavioural Verification: Preventing Report Fraud in Decentralized Advert Distribution Systems", Future Internet, vol. 9, Issue 88, Nov. 20, 2017, 23 pages.

Zawadziński, Maciej, https://clearcode.cc/blog/rtb-online-advertising-fraud, "What is Ad Fraud and How Does It Work? 9 Techniques Explained", Mar. 11, 2014, 19 pages.

* cited by examiner

METHOD AND SYSTEM FOR HARDWARE AND SOFTWARE BASED USER IDENTIFICATION FOR ADVERTISEMENT FRAUD DETECTION

TECHNICAL FIELD

The present disclosure relates to the field of fraud detection systems and, in particular, relates to a method and system to detect and authenticate fraud in advertisements.

Introduction

With the advancements in technology over the last few years, users have predominantly shifted towards smartphones for accessing multimedia content. Nowadays, users access content through a number of applications available for download through various online application stores. Businesses (Advertisers) have started focusing on generating revenue by targeting consumers through these applications. In addition, businesses have started investing heavily in doing business through these applications. Moreover, businesses (publishers and/or advertising networks) have started developing capable advertisement applications for serving advertisements through these applications. These advertisements are published in real time or fixed placements through these applications and watched by the users. The advertisers are benefited in terms of internet traffic generated by clicking, taking action like installing or on watching these advertisements. However, certain online publishers and advertising networks working with these publishers take undue advantage of this in order to generate high revenues. These online publishers and advertising networks employ fraudulent techniques in order to generate clicks, or increasing actions like increasing number of application installs for the advertisers through fraudulent means. Typically, these publishers make use of various types of devices which continuously operate in order to perform click spamming and drive installs. This results in a loss of advertisers marketing budget spent as many times these publishers claim a normal user-initiated action (Organic action, e.g. Organic Install) as one initiated by them or at times the clicks or application installs are not driven by humans at all and instead by bots. There is a consistent need to stop publishers from performing such types of click fraud and transaction fraud.

SUMMARY

In a first example, a computer system is provided. The computer system includes one or more processors and a memory. The memory is coupled to the one or more processors. The memory stores instructions. The instructions are executed by the one or more processors. The execution of instructions causes the one or more processors to perform a method for detection of online advertisement fraud and commerce fraud. The method includes a first step of collecting a first set of data from a plurality of components associated with each device of a plurality of devices in real-time at a fraud detection system with a processor. The method includes another step of receiving a second set of data associated with each device of a plurality of third party devices in real-time at the fraud detection system with the processor. The method includes yet another step of creating a unique device profile for each device of the plurality of devices at the fraud detection system with the processor. The method includes yet another step of calculating a probabilistic score for detection of the online advertisement and the commerce fraud in real-time at the fraud detection system with the processor. The method includes another step of analyzing the first set of data and the second set of data after a periodic interval of time at the fraud detection system with the processor. The method includes yet another step of detecting the online advertisement fraud and commerce fraud based on the analysis of the first set of data and the second set of data in real-time at the fraud detection system with the processor. The plurality of components includes one or more hardware components and one or more software components of each device of the plurality of devices. The plurality of components includes a plurality of device sensors, a plurality of device biometrics and a plurality of device connectivity components. The plurality of third party devices is connected with each other and the plurality of devices. Each device of the plurality of third party devices is assigned with a unique identity by the fraud detection system. The unique device profile stores the corresponding first set of data collected from each device of the plurality of devices. The probabilistic score is calculated based on the first set of data collected from the plurality of components associated with each device of the plurality of devices and the second set of data received from each device of the plurality of third party devices. The first set of data and the second set of data is analyzed with a pre-defined set of data. The analyzing is done to measure deviation in the first set of data and the second set of data from the pre-defined set of data after the periodic interval of time. The analyzing is done using one or more strategies. The analyzing is done to detect the online advertisement and commerce fraud using a correlation data. The detection is done based on one or more techniques. The one or more techniques include at least one of cross device mapping, and digital fingerprinting.

In an embodiment of the present disclosure, the first set of data is data associated with gyroscope sensor, accelerometer sensor, device ID data, IP address data, Bluetooth data, network data, touch sensor data, 3D sensor data, location data, and motion data.

In an embodiment of the present disclosure, the second set of data is data associated with gyroscope sensor, accelerometer sensor, device ID data, IP address data, Bluetooth data, network data, touch sensor data, 3D sensor data, location data, and motion data of each device of the plurality of third party devices.

In an embodiment of the present disclosure, the plurality of device sensors includes at least one of a gyroscope sensor, an accelerometer sensor, a magnetometer, a proximity sensor, a barometer sensor, a compass, a touch sensor, a GPS sensor and a motion sensor.

In an embodiment of the present disclosure, the plurality of device biometrics includes at least one of one of fingerprint scanner, 3D sensors, face recognition, voice recognition, retina scanner and iris scanner.

In an embodiment of the present disclosure, the second set of data is received from each device of the plurality of third party devices to facilitate in the detection of the online advertisement fraud and commerce fraud.

In an embodiment of the present disclosure, the pre-defined set of data includes ideal values that must be maintained for each of the plurality of components associated with each device of the plurality of devices.

In an embodiment of the present disclosure, the correlation data includes a positive correlation data and a negative correlation data. The positive correlation data is based on pre-event and post-event data. The negative correlation data is based on non-human behaviour data.

In an embodiment of the present disclosure, the first set of data collected from the plurality of components associated with each device of the plurality of devices is used to create a user profile. The user profile is created in real-time.

In a second example, a computer-implemented method is provided. The computer-implemented method detects online advertisement fraud and commerce fraud. The computer-implemented method includes a first step of collecting a first set of data from a plurality of components associated with each device of a plurality of devices in real-time at a fraud detection system. The computer-implemented method includes another step of receiving a second set of data associated with each device of a plurality of third party devices in real-time at the fraud detection system. The computer-implemented method includes yet another step of creating a unique device profile for each device of the plurality of devices at the fraud detection system. The computer-implemented method includes yet another step of calculating a probabilistic score for detection of the online advertisement and the commerce fraud in real-time at the fraud detection system. The computer-implemented method includes another step of analyzing the first set of data and the second set of data after a periodic interval of time at the fraud detection system. The computer-implemented method includes yet another step of detecting the online advertisement fraud and commerce fraud based on the analysis of the first set of data and the second set of data in real-time at the fraud detection system. The plurality of components includes one or more hardware components and one or more software components of each device of the plurality of devices. The plurality of components includes a plurality of device sensors, a plurality of device biometrics and a plurality of device connectivity components. The plurality of third party devices is connected with each other and the plurality of devices. Each device of the plurality of third party devices is assigned with a unique identity by the fraud detection system. The unique device profile stores the corresponding first set of data collected from each device of the plurality of devices. The probabilistic score is calculated based on the first set of data collected from the plurality of components associated with each device of the plurality of devices and the second set of data received from each device of the plurality of third party devices. The first set of data and the second set of data is analyzed with a pre-defined set of data. The analyzing is done to measure deviation in the first set of data and the second set of data from the pre-defined set of data after the periodic interval of time. The analyzing is done using one or more strategies. The analyzing is done to detect the online advertisement and commerce fraud using a correlation data. The detection is done based on one or more techniques. The one or more techniques include at least one of cross device mapping, and digital fingerprinting.

In an embodiment of the present disclosure, the first set of data is data associated with gyroscope sensor, accelerometer sensor, device ID data, IP address data, Bluetooth data, network data, touch sensor data, 3D sensor data, location data, and motion data.

In an embodiment of the present disclosure, the second set of data is data associated with gyroscope sensor, accelerometer sensor, device ID data, IP address data, Bluetooth data, network data, touch sensor data, 3D sensor data, location data, and motion data of each device of the plurality of third party devices.

In an embodiment of the present disclosure, the plurality of device sensors includes at least one of a gyroscope sensor, an accelerometer sensor, a magnetometer, a proximity sensor, a barometer sensor, a compass, a touch sensor, a GPS sensor and a motion sensor.

In an embodiment of the present disclosure, the plurality of device biometrics includes at least one of one of fingerprint scanner, 3D sensors, face recognition, voice recognition, retina scanner and iris scanner.

In an embodiment of the present disclosure, the second set of data is received from each device of the plurality of third party devices to facilitate in the detection of the online advertisement fraud and commerce fraud.

In an embodiment of the present disclosure, the pre-defined set of data includes ideal values that must be maintained for each of the plurality of components associated with each device of the plurality of devices.

In an embodiment of the present disclosure, the correlation data includes a positive correlation data and a negative correlation data. The positive correlation data is based on pre-event and post-event data. The negative correlation data is based on non-human behaviour data.

In a third example, a non-transitory computer-readable storage medium is provided. The computer-readable storage medium encodes computer executable instructions that, when executed by at least one processor, performs a method. The method detects online advertisement fraud and commerce fraud. The method includes a first step of collecting a first set of data from a plurality of components associated with each device of a plurality of devices in real-time at a computing device. The method includes another step of receiving a second set of data associated with each device of a plurality of third party devices in real-time at the computing device. The method includes yet another step of creating a unique device profile for each device of the plurality of devices at the computing device. The method includes yet another step of calculating a probabilistic score for detection of the online advertisement and the commerce fraud in real-time at the computing device. The method includes another step of analyzing the first set of data and the second set of data after a periodic interval of time at the computing device. The method includes yet another step of detecting the online advertisement fraud and commerce fraud based on the analysis of the first set of data and the second set of data in real-time at the computing device. The plurality of components includes one or more hardware components and one or more software components of each device of the plurality of devices. The plurality of components includes a plurality of device sensors, a plurality of device biometrics and a plurality of device connectivity components. The plurality of third party devices is connected with each other and the plurality of devices. Each device of the plurality of third party devices is assigned with a unique identity by the fraud detection system. The unique device profile stores the corresponding first set of data collected from each device of the plurality of devices. The probabilistic score is calculated based on the first set of data collected from the plurality of components associated with each device of the plurality of devices and the second set of data received from each device of the plurality of third party devices. The first set of data and the second set of data are analyzed with a pre-defined set of data. The analyzing is done to measure deviation in the first set of data and the second set of data from the pre-defined set of data after the periodic interval of time. The analyzing is done using one or more strategies. The analyzing is done to detect the online advertisement and commerce fraud using a correlation data. The detection is done based on one or more techniques. The one or more techniques include at least one of cross device mapping, and digital fingerprinting.

BRIEF DESCRIPTION OF DRAWINGS

Having thus described the invention in general terms, references will now be made to the accompanying figures, wherein:

It should be noted that the accompanying figures are intended to present illustrations of exemplary embodiments of the present disclosure. These figures are not intended to limit the scope of the present disclosure. It should also be noted that accompanying figures are not necessarily drawn to scale.

DETAILED DESCRIPTION

In the following description, for purposes of explanation, numerous specific details are set forth in order to provide a thorough understanding of the present technology. It will be apparent, however, to one skilled in the art that the present technology can be practiced without these specific details. In other instances, structures and devices are shown in block diagram form only in order to avoid obscuring the present technology.

Reference in this specification to "one embodiment" or "an embodiment" means that a particular feature, structure, or characteristic described in connection with the embodiment is included in at least one embodiment of the present technology. The appearance of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Moreover, although the following description contains many specifics for the purposes of illustration, anyone skilled in the art will appreciate that many variations and/or alterations to said details are within the scope of the present technology. Similarly, although many of the features of the present technology are described in terms of each other, or in conjunction with each other, one skilled in the art will appreciate that many of these features can be provided independently of other features. Accordingly, this description of the present technology is set forth without any loss of generality to, and without imposing limitations upon, the present technology.

Figure 1A:
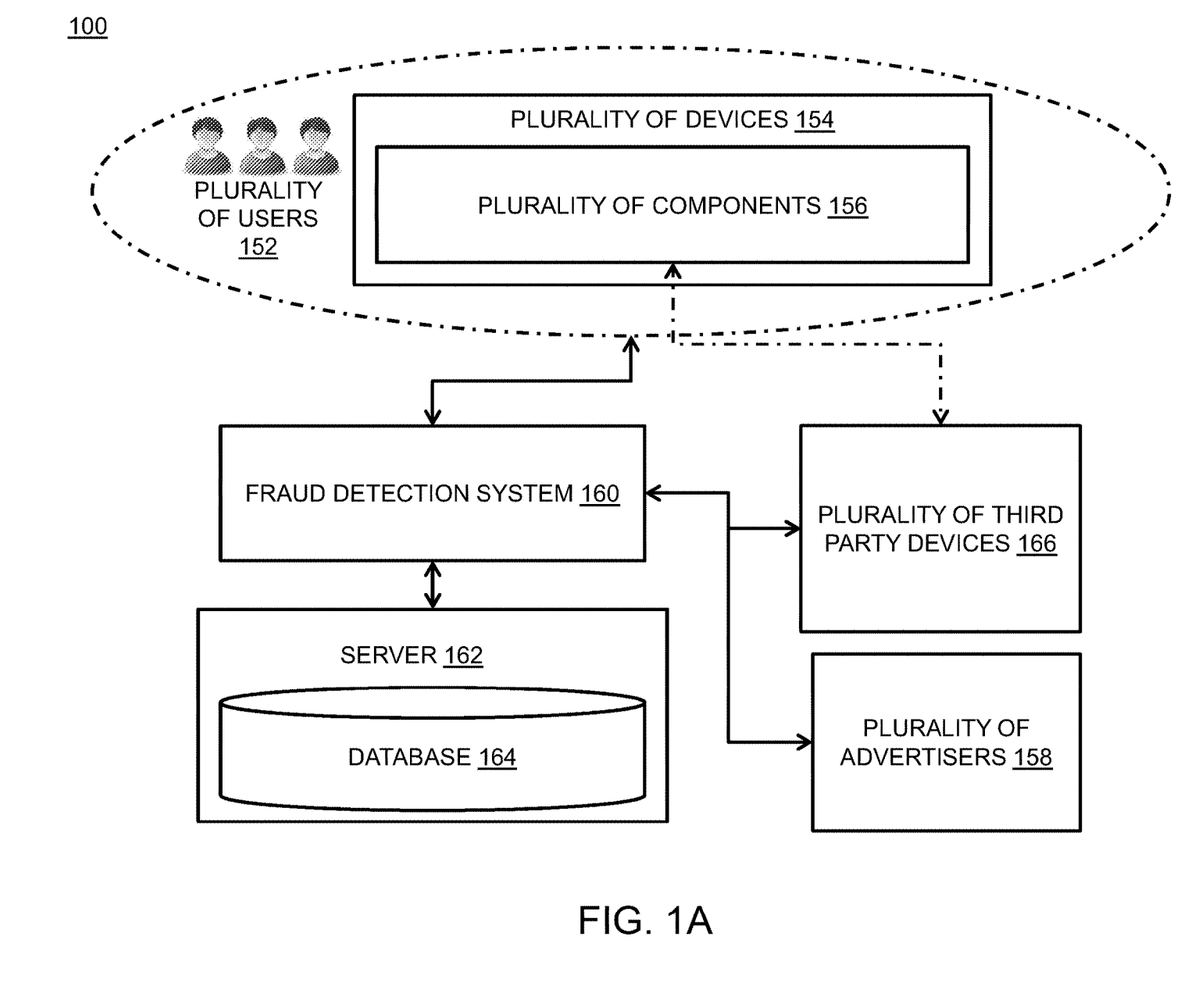
FIG. 1A illustrates an interactive computing environment between users and one or more components for detection of fraud in advertisements in real time, in accordance with various embodiments of the present disclosure.

FIG. 1A illustrates an interactive computing environment 100 between a plurality of users 152 and one or more components for detection of online advertisement fraud and commerce fraud in real time, in accordance with various embodiments of the present disclosure. The interactive computing environment 100 includes the plurality of users 152, a plurality of devices 154, a plurality of components 156, a plurality of advertisers 158, a fraud detection system 160, a server 162, a database 164 and a plurality of third party devices 166. Further, the plurality of components 156 includes a plurality of device sensors 156a, a plurality of device biometrics 156b and a plurality of device connectivity components 156c. The online advertisement fraud and commerce fraud detection is performed based on one or more hardware components and one or more software components associated with each device of the plurality of devices 154. In an example, the one or more hardware components include gyroscope sensor, accelerometer sensor, magnetometer, barometer and the like. In another example, the one or more software components include Bluetooth, WiFi, network, infrared and the like. Further, the fraud in advertisements corresponds to click fraud, transaction fraud and the like. The click fraud corresponds to regular or constant clicking by a user or a group of users on an advertisement in order to generate more revenue for a publisher. The transaction fraud takes place when the publisher applies fraudulent techniques to drive fake installs of applications associated with an advertiser in order to generate more revenue. The interactive computing environment 100 shows interaction between various entities for the detection of fraud in advertisements.

The advertisements are displayed in third party applications developed by application developers. The application developers are known as publishers. The advertisements may include a graphical advertisement, a video advertisement, a banner advertisement and the like. The interactive computing environment 100 shows a relationship between various entities involved in the detection of the online advertisement fraud and commerce fraud. The online advertisement fraud and commerce fraud is detected based on information received from the plurality of components 156 associated with each device of the plurality of devices 154 in real time. The plurality of components 156 includes the one or more hardware components and the one or more software components of each device of the plurality of devices 154. The plurality of device sensors 156a is embedded inside the plurality of devices 154. In an example, the plurality of device sensors 156a includes but may not be limited to gyroscope sensor and accelerometer sensor. Further, each component of the plurality of components 156 interacts with each other to enable detection of the online advertisement fraud and commerce fraud in real time. The interactive computing environment 100 aids in tackling the online advertisement fraud and commerce fraud in applications in real time. The online advertisement fraud in applications refers to use of fraudulent techniques by publishers to generate fake online traffic. The online traffic is faked through techniques such as click fraud, transaction fraud and the like. The click fraud refers to generation of fraudulent clicks through online bots which are not identifiable to the plurality of advertisers 158 who treat the same as genuine online traffic. The transaction fraud refers to enabling application installs by providing some kind of incentive to the plurality of users 152 in real time or making claims of initiating install via fake clicks and bots (as described above in the application).

Further, a user of the plurality of users 152 is associated with a device of the plurality of devices 154. The plurality of users 152 are individuals or persons who access online multimedia content on respective devices. In addition, the plurality of users 152 may be any individuals or persons who run an application in real time on any platform such as Android, Mac and the like. The plurality of users 152 may be any persons or individuals who are committing the online advertisement fraud and commerce fraud in real time. The plurality of users 152 may be administrators associated with applications running on each device of the plurality of devices 154. The plurality of users 152 may be present at a single location, or at different locations. The plurality of users 152 may be hired by a publisher for performing fraudulent activities such as click spamming, ad driven installs and the like. The plurality of users 152 may belong to any third party which is in direct contract with the plurality of advertisers 158 for enabling display of advertisements. Further, a user of the plurality of users 152 is accessing a publisher on a device of the plurality of devices 154. In an example, the plurality of devices 154 includes smartphone, set-top box, television, voice assistants and the like. In general, the smartphone is an Internet-enabled device for allowing the plurality of users 152 to access the publishers. The publishers are applications who display content to the plurality of users 152. The content may include one or more publisher content, one or more video content and the like. The plurality of devices 154 may or may not be fraudulent devices. The plurality of users 152 may or may not be fraudulent users. The plurality of devices 154 may be utilized by the plurality of users 152 to commit fraud in advertisements displayed in the applications.

Figure 1B:
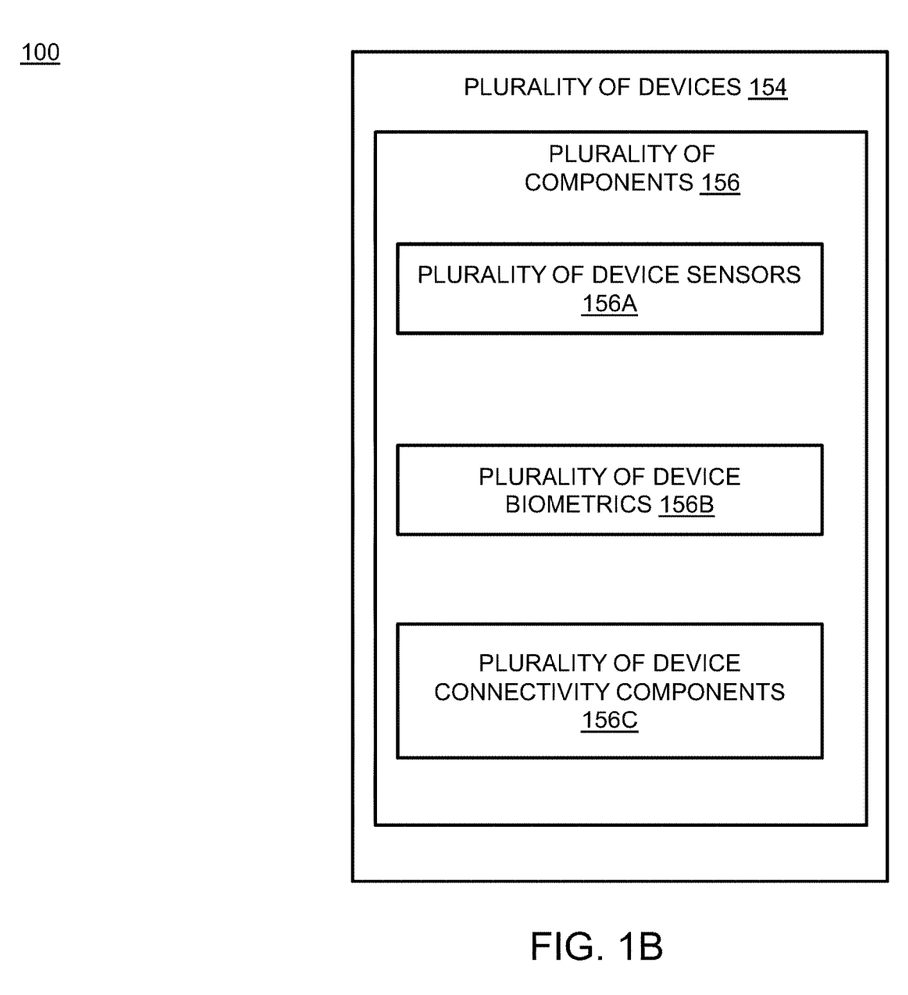
FIG. 1B illustrates a block diagram of each device of a plurality of devices, in accordance with various embodiments of the present disclosure.

The applications are software applications developed by third-party online publishers. The applications are advertisement supporting applications. The applications may be any type of application such as a gaming application, a utility application, a service based application and the like. The publishers provide space, areas or a part of their application pages for advertising purposes. These areas or spaces on the application pages are referred to as advertisement slots. The application page can have the various advertisement slots depending on the choice of each of the publishers. The publishers advertise products, services or businesses to the plurality of users 152 for generating revenue. Further, each device of the plurality of devices 154 includes the plurality of components 156. The plurality of components 156 includes the plurality of hardware components and the plurality of software components. In an example, the one or more hardware components include the plurality of device sensors 156a embedded inside the plurality of devices 154. In addition, the plurality of device sensors 156a include at least one of gyroscope sensor, an accelerometer sensor, a magnetometer, a proximity sensor, a barometer sensor, a compass, a touch sensor, a GPS sensor, a motion sensor and the like. In general, the accelerometer sensor is a sensor which is used to detect orientation of a device. In addition, the accelerometer sensor measures linear acceleration of movement. Also, the accelerometer sensor measures directional movement of the device. The accelerometer sensor measures a tilting motion of the device. The accelerometer sensor is used for motion sensing gaming in devices.

In general, the gyroscope sensor adds to information provided by the accelerometer sensor by tracking rotation or twist of the device. The gyroscope sensor measures the angular rotational velocity of the device. Further, the gyroscope sensor aids the accelerometer sensor to determine which way the device is oriented. In addition, the gyroscope sensor is used to maintain and control position, level or orientation of the device based on principle of angular momentum. In addition, each device of the plurality of devices 154 includes other sensors which are used for the online advertisement fraud and commerce fraud detection in real time. Further, the plurality of device biometrics 156b include at least one of fingerprint scanner, 3D sensors, face recognition, voice recognition, retina scanner, iris scanner and the like. Furthermore, the plurality of device connectivity components 156c include at least one of Bluetooth, infrared, NFC, WiFi, network, direct cable, USB, wireless charging and the like. The plurality of users 152 accesses the publishers in real time on the plurality of devices 154. The online publishers continuously display advertisements through the applications. The plurality of users 152 encounters the advertisements while accessing the publishers. The advertisements may include text advertisements, video advertisements, graphic advertisements and the like. The plurality of users 152 may click on the advertisements and re-directed to a website of the advertiser associated with the corresponding clicked advertisement. The advertisements are provided by the plurality of advertisers 158. The plurality of advertisers 158 provide advertisements to the publishers for displaying on their application. The advertisements are placed on the advertisement slots in the applications.

The one or more advertisers purchase the advertisement slots from the one or more publishers. The advertisements may be served based on a real-time bidding technique or a direct contract between the plurality of advertisers 158 and the publishers. The plurality of advertisers 158 may provide the advertisements to advertising networks and information associated with advertising campaigns. The advertisement networks enable display of the advertisements in real time on the applications on behalf of the plurality of advertisers 158. The advertising networks are entities that connect the plurality of advertisers 158 to websites and applications that are willing to serve advertisements. Further, the fraud detection system 160 is associated with the publishers. The fraud detection system 160 is linked with multiple online publishers in real time. The online publishers correspond to the applications (the publishers). The fraud detection system 160 is a platform for detecting click fraud and transaction fraud done by the online publishers in real time. The fraud detection system 160 performs the detection of the online advertisement fraud and commerce fraud in real time. The fraud detection system 160 performs the online advertisement fraud and commerce fraud detection based on real time data obtained from the plurality of components 156.

The fraud detection system 160 is associated with the plurality of components 156 in real time. In an embodiment of the present disclosure, the fraud detection system 160 is linked with the plurality of components 156 through the internet. In another embodiment of the present disclosure, the plurality of devices 154 must be connected to the internet through any means in real time. In an embodiment of the present disclosure, the fraud detection system 160 collects a first set of data from the plurality of components 156 in real time. The plurality of components 156 is associated with each device of the plurality of devices 154. The first set of data is received periodically through a communication network present between the fraud detection system 160 and the plurality of devices 154. In an example, the first set of data is associated with data collected from the gyroscope sensor and the accelerometer sensor embedded in each device of the plurality of devices 154. The first set of data is collected for determining a current position of each device of the plurality of devices 154 in terms of angular position, acceleration and the like. The fraud detection system 160 utilizes the first set of data to determine whether each device of the plurality of devices 154 is used to commit the online advertisement fraud and commerce fraud or not. The first set of data is data associated with gyroscope sensor, accelerometer sensor, device ID data, IP address data, Bluetooth data, network data, touch sensor data, 3D sensor data, location data, and motion data. In an example, the first set of data may include device IDs, IP address and the like along with data collected from the plurality of device sensors 156a for each device of the plurality of devices 154. In an embodiment of the present disclosure, the fraud detection system 160 stores the first set of data in the database 164 of the server 162. In an example, the fraud detection system 160 collects the first set of data from the plurality of device sensors 156a and stores the first set of data in the database 164.

The fraud detection system 160 is associated with the plurality of third party devices 166. The plurality of third party devices 166 may or may not be connected to the plurality of devices 154 in real time. The plurality of third party devices 166 is equipped with wired or wireless communication networks. In an embodiment of the present disclosure, the plurality of third party devices 166 interchange a second set of data with each other and the plurality of devices 154. Each device of the plurality of third party devices 166 interchanges a second set of data with the fraud detection system 160. The second set of data received from the plurality of third party devices 166 is utilized to determine and authenticate the online advertisement fraud and commerce fraud. In an embodiment of the present disclosure, the plurality of third party devices 166 is electronic devices, digital devices, communication devices, watch, headsets, input devices, payment devices, printers, display, storage devices, set top boxes, network devices, home automation devices, speakers and the like. In another embodiment of the present disclosure, the plurality of third party devices 166 include but may not be limited to televisions, radios, smartphones, laptops, desktops, and digital cameras. In yet another embodiment of the present disclosure, the plurality of third party devices 166 includes any other suitable devices of the like.

The plurality of third party devices 166 associated with the interactive computing environment 100 is connected devices. In general, connected devices correspond to a plurality of devices connected to one another with the facilitation of communication networks with the facilitation of different wired or wireless protocols. In an example, different wired or wireless protocols include but may not be limited to Bluetooth, NFC, Wi-Fi, broadband and the like. In an embodiment of the present disclosure, the plurality of third party devices 166 are connected to each other with the facilitation of any other suitable communication network of the like. Further, each device of the plurality of third party devices 166 can operate to some extent interactively and autonomously. The fraud detection system 160 receives the second set of data associated with the plurality of third party devices 166 in real-time. In an embodiment of the present disclosure, the received second set of data is associated with the plurality of devices 154. The second set of data is data associated with gyroscope sensor, accelerometer sensor, device ID data, IP address data, Bluetooth data, network data, touch sensor data, 3D sensor data, location data, and motion data of each device of the plurality of third party devices.

Further, the plurality of third party devices 166 is connected with each other and the plurality of devices 154. The plurality of third party devices 166 and the plurality of devices 154 are equipped with wireless beacon technology. In general, wireless beacon technology corresponds to a technology that allows wireless communication devices to broadcast or receive data within finite distances. The beacon technology consists of two main components: a broadcaster beacon and a receiver beacon. The beacon technology activates and facilitates in data sharing between broadcaster beacon and receiver beacon. The beacon technology activates data sharing as soon as the broadcaster beacon and the receiver beacon comes in the vicinity of one another. The plurality of third party devices 166 and the plurality of devices 154 act as two main components of the beacon technology. In an embodiment of the present disclosure, the plurality of devices 154 act as broadcaster beacons and the plurality of third party devices 166 act as receiver beacons. In another embodiment of the present disclosure, the plurality of devices 154 act as receiver beacons and the plurality of third party devices 166 act as broadcaster beacons.

In addition, the fraud detection system 160 assigns a unique identity to each of the plurality of third party devices 166. In an embodiment of the present disclosure, the fraud detection system 160 assigns a unique identity to each of the plurality of devices 154. In an embodiment of the present disclosure, the plurality of devices communicate with the plurality of third party devices 166 using at least one of WLAN, NFC, Bluetooth, broadband, wireless beacon technology and the like.

Further, the fraud detection system 160 monitors and analyzes activities and operations of the plurality of devices 154 with facilitation of the plurality of third party devices 166. The fraud detection system 160 receives a plurality of sets of data (the first set of data and the second set of data) associated with the plurality of devices 154 with the facilitation of the plurality of third party devices 166. The fraud detection platform 160 processes and analyzes the first set of data and the second set of data associated with the plurality of devices 154 and the plurality of third party devices 166. The fraud detection system 160 analyzes the first set of data and the second set of data after a periodic interval of time. The fraud detection system 160 analyzes the first set of data and the second set of data with a pre-defined set of data. Further, the pre-defined set of data includes ideal values that must be maintained for each of the plurality of components 156 associated with the each device of the plurality of devices 154. In an embodiment of the present disclosure, the periodic interval of time may be variable or constant according to requirement. In an example, the fraud detection system 160 analyzes the first set of data and the second set of data after the periodic interval of time of 5 hours.

In an embodiment of the present disclosure, the fraud detection system 160 analyzes duration of time in which the first set of data collected from the plurality of device sensors 156a is zero. In an embodiment of the present disclosure, the fraud detection system 160 detects the online advertisement and commerce fraud if the first set of data collected from the plurality of device sensors 156a is zero for long periods of time. In an example, if the first set of data received from the gyroscope and accelerometer sensor for a device of the plurality of devices 154 is zero for a long period of time, the fraud detection system 160 treats this as the online advertisement fraud and commerce fraud as there is no movement of the device. The fraud detection system 160 detects the same as fraud and may determine that the device from which advertisement traffic is being generated may be used for performing fraud. In an embodiment of the present disclosure, the fraud detection system 160 performs a probabilistic determination of the online advertisement fraud and commerce fraud in real time. The fraud detection system 160 may derive that a particular device is kept at a stationary position or fixed position for a long period of time and is currently used for fraudulent purposes. The fraud detection system 160 may derive that the device might be used for performing click spamming through bot initiated clicks in real time. In an embodiment of the present disclosure, the fraud detection system 160 may perform complex event processing for performing the probabilistic fraud detection.

Further, the fraud detection system 160 calculates a probabilistic score for detection of the online advertisement fraud and commerce fraud in real time. In an embodiment of the present disclosure, the fraud detection system 160 calculates the probabilistic score for each device of the plurality of devices 154. In another embodiment of the present disclosure, the fraud detection system 160 calculates the probabilistic score for each device of the plurality of third party devices 166. The fraud detection system 160 may immediately block the device IDs or IP addresses through which the fraud is being performed. In an embodiment of the present disclosure, the fraud detection system 160 utilizes the first set of data and the second set of data to determine the online advertisement fraud and commerce fraud. The fraud detection system 160 analyzes the first set of data and the second set of data to detect the online advertisement and commerce fraud using a correlation data. Further, the correlation data includes a positive correlation data and a negative correlation data. The positive correlation data is based on pre-event and post-event data. The positive correlation may occur before any event (say installs) and post event. In an example, the event includes determination of same behavior of the plurality of users 152 with similar finger size. In an embodiment of the present disclosure, the touch sensors can determine hardness of the press, and size of the area pressed which may provide a rough determination of size of the finger. The negative correlation data is based on non-human behavior data. In an example, touches without any change to the accelerometer or gyroscope or compass during the time prior and after the interaction. The fraud detection system 160 takes into account a way the plurality of users 152 hold and interact with the corresponding plurality of devices 154. The fraud detection system 160 checks the same prior to the event and post the event to determine likelihood that the event was performed by the same person. The fraud detection system 160 detects that the online advertisement fraud and commerce fraud has occurred if there is a significant change between the style with which the user has held the device and interacted with the device.

Further, the fraud detection system 160 detects the online advertisement fraud and commerce fraud based on the analysis of the first set of data and the second set of data in real-time. The fraud detection system 160 detects the online advertisement fraud and commerce fraud based on one or more techniques. The one or more techniques include at least one of cross device mapping, digital fingerprinting and the like. The fraud detection system 160 authenticates the online advertisement fraud and commerce fraud based on the detection. In an embodiment of the present disclosure, each hardware component of the one or more hardware components and each software component of the one or more software components captures the first set of data. Each hardware component and software component sends the first set of data to the server 162 of application or in the cloud for analysis or hashed as a fingerprint. The server 162 controls the method with which the first set of data is sent. In an embodiment of the present disclosure, the accelerometer data can be used individually to determine the behavior of each user of the plurality of users 152. In an example, if the user behavior is random or no movement over a period of time is recorded, then it may be a sign that this is not a human who is interacting with the device. In an embodiment of the present disclosure, the fraud detection system 160 utilizes specific algorithms to filter out machine generated accelerometer behavior versus human based behavior. In an embodiment of the present disclosure, the accelerometer behavior can be used in conjunction with other sensors like touch sensors. In an example, when the user presses on an item on the device, the device moves slightly showing that this is human interaction.

In an embodiment of the present disclosure, the gyroscope or compass data can be individually used to determine behavior of each user of the plurality of users 152. The gyroscope or compass data may be used to generate an engagement to movement fingerprint. In an example, if there is no tilt or rotation then this is a sign of a non-human user. In an embodiment of the present disclosure, the fraud detection system 160 utilizes specific algorithms to filter out machine generated gyroscope behavior versus human based behavior. In an embodiment of the present disclosure, the gyroscope behavior can be used in conjunction with other sensors like touch sensors. In an example, when the user of the plurality of users 152 presses on an item on the device of the plurality of devices 154, the device rotates slightly showing that this is a human interaction. In addition, if a button is at the bottom of the screen of the device versus the top of the screen, the device will have a different rotation. In an embodiment of the present disclosure, the touch sensor data may be used to detect hardness or footprint of the press of the user on the device. In addition, the touch sensor data may be used to detect characteristics of the swipe/pinch/zoom action. Moreover, the touch sensor data may be used to determine if the user is a human or computer based on a re-captcha. In an embodiment of the present disclosure, the data from network devices or Bluetooth devices may be used for determining whether the user is a human or a computer. In an embodiment of the present disclosure, the fraud detection system 160 may access connected devices and compress a fingerprint of the connected devices to send to the server 162. The fraud detection system 160 may make a probabilistic determination that it is the same user and not a bot if the device has matching Bluetooth devices/network devices. In an example, there is a low chance for the bot of having a connected airpods/Bluetooth devices in use.

In an embodiment of the present disclosure, the fraud detection system 160 utilizes the first set of data collected from the plurality of components 156 to create a user profile. The user profile can be used to help match pre event (say a click) to post event interactions. In an embodiment of the present disclosure, the fraud detection system 160 employs additional security in order to stop replay attacks which can be used to return the device parameters or change the device parameters. The additional security may help in ensuring that a certain type of randomness is known and devices that just have a robot to reply are blocked from the system. In an embodiment of the present disclosure, the fraud detection system 160 continuously monitors and analyzes the first set of data collected through the plurality of components 156 of each device of the plurality of devices 154. The fraud detection system 160 builds a confidence score for determining whether there is any fraud or not. In an embodiment of the present disclosure, the fraud detection system 160 uses supervised machine learning and non-supervised machine learning. In an embodiment of the present disclosure, the fraud detection system 160 utilizes algorithms to intelligently adapt itself to the continuous change in the data.

In an embodiment of the present disclosure, the fraud detection system 160 performs the online advertisement fraud and commerce fraud detection in real time. The fraud detection system 160 immediately alerts the plurality of advertisers 158 or merchant or bank about the online advertisement fraud and commerce fraud so that the advertiser can block the flow of payment to the publisher or seller. In an embodiment of the present disclosure, the fraud detection system 160 builds a profile about a list of devices associated with a particular publisher or seller based on the fraud detection through the first set of data and the second set of data received from the plurality of components 156 and block display of advertisements or promotion of products through the particular publisher or supplier. In an example, the fraud detection system 160 may take into account the periodic interval of time in which the gyroscope data or the accelerometer data is null, and when the time exceeds the threshold time, the system can determine that as a fraud. In an embodiment of the present disclosure, the fraud detection system 160 may detect any wrong or misleading information associated with the first set of data collected from the plurality of components 156 in order to not term the same as fraud. In an embodiment of the present disclosure, the fraud detection system 160 may determine fraud based on a combination of the first set of data from the gyrometer, accelerometer, Bluetooth, network, touch sensors, 3D sensors and the like. In an embodiment of the present disclosure, the fraud detection system 160 may take into account a behavior profile of the plurality of users 152 and patterns based on data associated with a daily routine and a time period in which the gyroscope data and accelerometer data is consistent and does not change much and time periods in which the data from these sensors alter too much or not at all. The profiles and patterns may be at individual device levels or a group level.

In an embodiment of the present disclosure, the fraud detection system 160 takes into account periods of a day when the device data is usually zero or altering too much to determine fraud patterns or incidents. This may show a deviation in usual data trends from the gyroscope and the accelerometer. In an embodiment of the present disclosure, the fraud detection system 160 may take into account a time taken in a change of component data after an application install. If the time taken is above a threshold value, then it may be termed as a fraud. Further, the fraud detection system 160 is linked to the server 162. In an embodiment of the present disclosure, the server 162 controls each and every operation performed by the fraud detection system 160. The server 162 processes the first set of data in real time to determine the online advertisement fraud and commerce fraud. The server 162 includes the database 164. The database 164 may store the first set of data and the second set of data associated with the fraud detection system 160.

In an embodiment of the present disclosure, the fraud detection system 160 performs authentication of the online advertisement and commerce fraud using cross device mapping. The interactive computing environment 100 integrates the plurality of devices 154 and the plurality of third party devices 166 for authentication of the online advertisement fraud and commerce fraud. The interactive computing environment 100 receives and processes the plurality of sets of data from the plurality of devices 154 for authentication of the online advertisement fraud and commerce fraud. The fraud detection system 160 facilitates in real time authentication of the online advertisement fraud and commerce fraud using cross device mapping. The fraud detection system 160 utilizes the plurality of sets of data received through the plurality of devices 154 in vicinity of a user of the plurality of users 152 to authenticate the online advertisement fraud and commerce fraud by a device of the plurality of devices 154 in real time. The fraud detection system 160 utilizes the plurality of devices 154 to identify one or more device associated with a fraud executing device to facilitate the process of fraud detection and authentication. The plurality of sets of data received from the plurality of devices 154 facilitates to authenticate click fraud and transaction fraud being done in the vicinity of the plurality of devices 154.

The fraud detection system 160 creates a unique device profile corresponding to each device of the plurality of devices 154. The fraud detection system 160 stores the plurality of sets of data associated with the plurality of devices 154 in corresponding profile of the plurality of devices 154. The unique device profile of the plurality of devices 154 can be used to authenticate the online advertisement and commerce fraud based on cross device mapping. In an embodiment of the present disclosure, the fraud detection system 160 builds a profile related to the preference of advertisements that are preferred on the plurality of devices 154. For example, if an application is downloaded on the device associated with a category not present in the corresponding unique device profile of the device the publisher may be practicing fraud. The fraud detection system 160 stores the plurality of sets of data associated with the plurality of devices 154 in corresponding device profile of the plurality of devices 154. The fraud detection system 160 updates in real time the plurality of sets of data associated with the plurality of devices 154 in the corresponding device profile of the plurality of devices 154. The fraud detection system 160 identifies preferences and patterns in the advertisements responded by the plurality of users 152 of the plurality of devices 154. The fraud detection system 160 processes and analyses the plurality of sets of data to compare and analyze irregularities in the previously recorded preferences and patterns. The fraud detection system 160 stores and updates the plurality of sets of data associated with the plurality of devices 154 to compare and analyze the advertisement fraud and commerce fraud based on previous recorded patterns. The fraud detection system 160 analyzes irregularities and deviation in the patterns and preferences of the plurality of users 152 of a particular device of the plurality of devices 154 to authenticate the online advertisement fraud and commerce fraud.

The fraud detection system 160 couples the plurality of sets of data associated with the plurality of devices 154 with current location data of device. The fraud detection system 160 receives and analyzes the plurality of sets of data coupled with current location data. The fraud detection system 160 analyzes the plurality of sets of data received from a particular location and vicinity of the particular location to identify the online advertisement fraud and commerce fraud. For example, if the plurality of sets of data received from a particular location and the vicinity of the particular location indicates repeated multiple clicks on one or more advertisements the application fraud is authenticated. The fraud detection system 160 analyzes the plurality of devices 154 in the vicinity of fraud executing device. The fraud detection system 160 authenticates the online advertisement fraud and commerce fraud with the facilitation of the current location data. In an embodiment of the present disclosure, the fraud detection system 160 authenticates advertisements with the facilitation of any other suitable data of the like. The fraud detection system 160 authenticates the online advertisement fraud and commerce fraud with the facilitation of digital fingerprinting. In general, digital fingerprinting is a technology that enables content owners to exercise greater control on content by effective identification, tracking and monitoring across distribution channels while opening additional monetization avenue by exploiting the extended value of digital assets. The fraud detection system 160 monitors the advertisements and advertised content displayed on the plurality of devices 154 with the facilitation of the plurality of third party devices 166. The fraud detection system 160 employs digital fingerprinting to monitored content displayed on the plurality of third party devices 166. The fraud detection system 160 analyzes a variation in advertisements responded by the plurality of users 152 on the plurality of devices 154. The fraud detection system 160 analyses and compares the advertisements viewed by the plurality of users 152 with the unique device profile of the particular user to determine variation and irregularities.

The fraud detection system 160 determines the publishers performing fraudulent activities in real time. The fraud detection system 160 deters, blocks or intercepts the publishers who generate more clicks and installs by fraudulent means. The fraud detection system 160 may take necessary action against publishers who are generating revenue by fraudulent means. In addition, the fraud detection system 160 blocks publishers who perform fraudulent activities such as click spamming to simulate fake traffic. Moreover, the fraud detection system 160 alerts the plurality of advertisers 158 about the fraudulent publishers in real time. Accordingly, the plurality of advertisers 158 may take appropriate action against the fraudulent publishers. In an embodiment of the present disclosure, the fraud detection system 160 may use ambient audio/sound to detect if each of one or more devices of the plurality of devices 154 is a real phone in a real environment or an emulated phone. The fraud detection system 160 performs a method for authentication of the online advertisement fraud and commerce fraud. The fraud detection system 160 may track online activity of the plurality of users 152 and interaction of the plurality of users 152 with the advertisements in real time. The fraud detection system 160 may track online interaction of the plurality of devices 154 with other devices to facilitate in authentication platform. For example, if a device is authenticated for executing fraud the one or more devices associated with the fraud executing device are examined.

Figure 2:
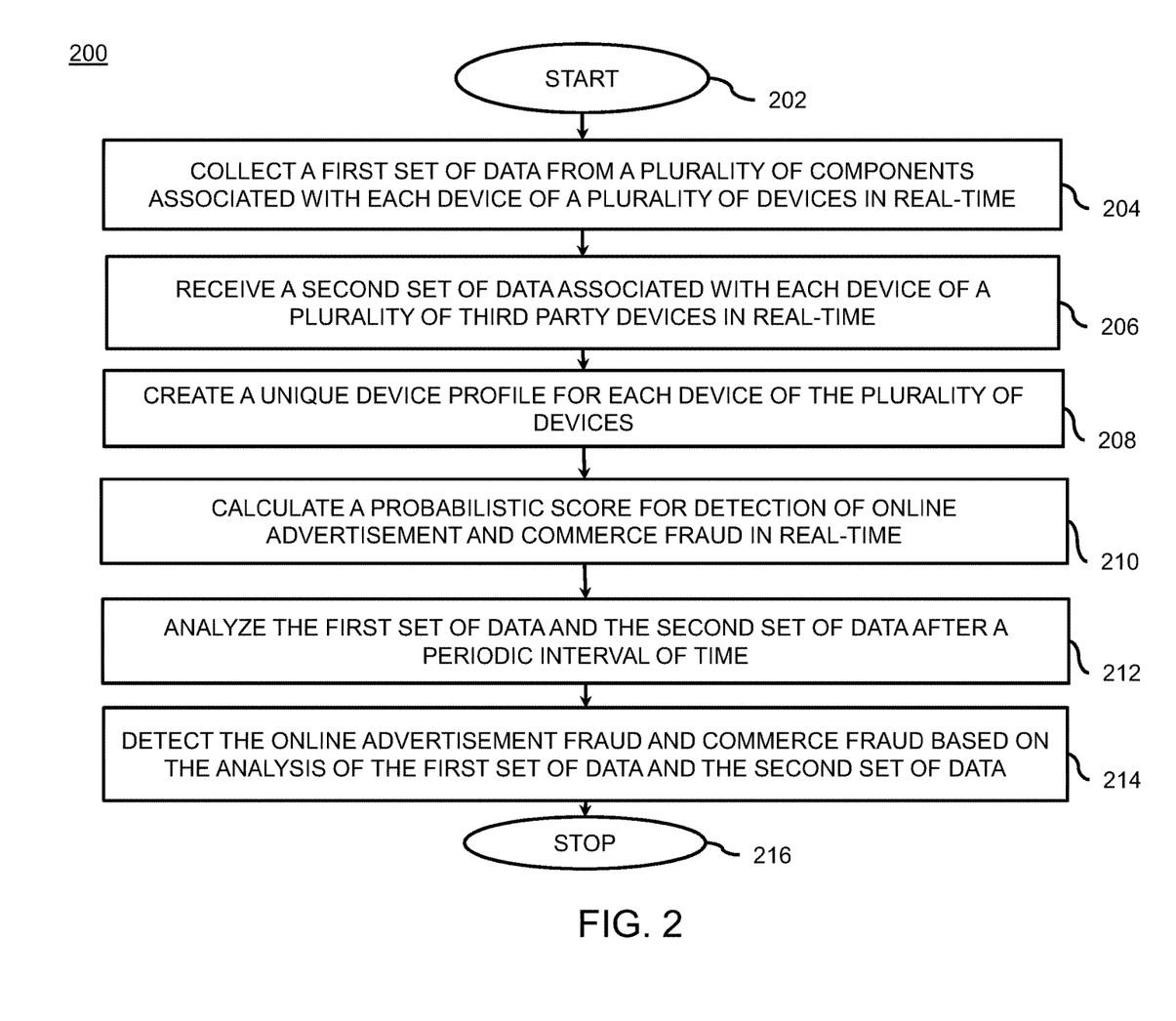
FIG. 2 illustrates a flow chart for detection of online advertisement fraud and commerce fraud, in accordance with various embodiments of the present disclosure.

FIG. 2 illustrates a flow chart 200 for detection of online advertisement fraud and commerce fraud, in accordance with various embodiments of the present disclosure. It may be noted that to explain the process steps of flowchart 200, references will be made to the system elements of FIG. 1A and FIG. 1B. It may also be noted that the flowchart 200 may have fewer or more number of steps.

The flowchart 200 initiates at step 202. Following step 202, at step 204, the fraud detection system 160 collects a first set of data from the plurality of components 156 associated with each device of a plurality of devices 154 in real-time. At step 206, the fraud detection system 160 receives a second set of data associated with each device of a plurality of third party devices 166 in real-time. At step 208, the fraud detection system 160 creates a unique device profile for each device of the plurality of devices 154. At step 210, the fraud detection system 160 calculates a probabilistic score for detection of online advertisement and commerce fraud in real-time. At step 212, the fraud detection system 160 analyzes the first set of data and the second set of data after a periodic interval of time. At step 214, the fraud detection system 160 detects the online advertisement fraud and commerce fraud based on the analysis of the first set of data and the second set of data. The flow chart 200 terminates at step 216.

Figure 3:
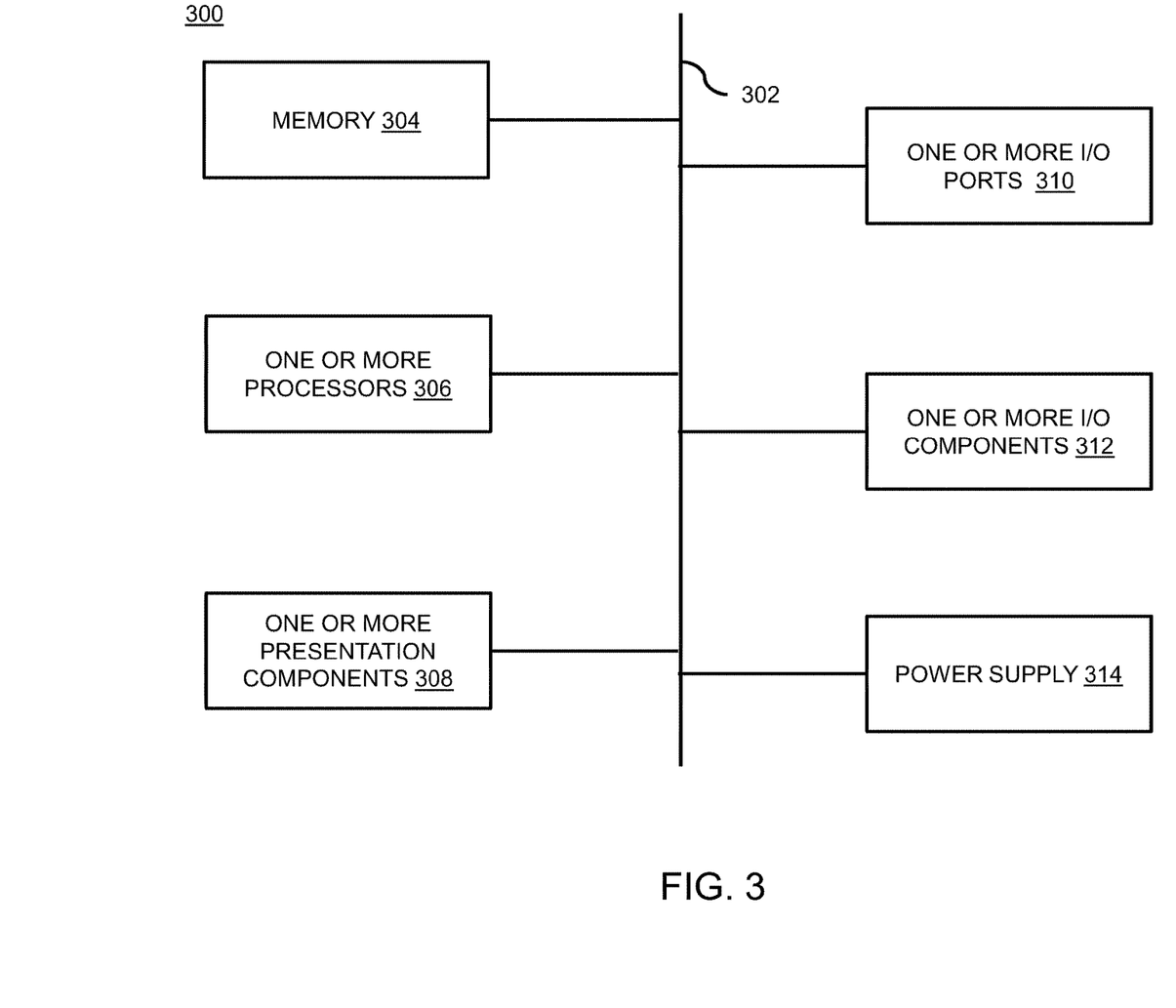
FIG. 3 illustrates a block diagram of a computing device, in accordance with various embodiments of the present disclosure.

FIG. 3 illustrates a block diagram of a device 300, in accordance with various embodiments of the present disclosure. The device 300 is a non-transitory computer readable storage medium. The device 300 includes a bus 302 that directly or indirectly couples the following devices: memory 304, one or more processors 306, one or more presentation components 308, one or more input/output (I/O) ports 310, one or more input/output components 312, and an illustrative power supply 314. The bus 302 represents what may be one or more busses (such as an address bus, data bus, or combination thereof). Although the various blocks of FIG. 3 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art, and reiterate that the diagram of FIG. 3 is merely illustrative of an exemplary device 300 that can be used in connection with one or more embodiments of the present invention. Distinction is not made between such categories as "workstation," "server," "laptop," "hand-held device," etc., as all are contemplated within the scope of FIG. 3 and reference to "computing device."

The computing device 300 typically includes a variety of computer-readable media. The computer-readable media can be any available media that can be accessed by the device 300 and includes both volatile and nonvolatile media, removable and non-removable media. By way of example, and not limitation, the computer-readable media may comprise computer storage media and communication media. The computer storage media includes volatile and nonvolatile, removable and non-removable media implemented in any method or technology for storage of information such as computer-readable instructions, data structures, program modules or other data. The computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the device 300. The communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 304 includes computer-storage media in the form of volatile and/or nonvolatile memory. The memory 304 may be removable, non-removable, or a combination thereof. Exemplary hardware devices include solid-state memory, hard drives, optical-disc drives, etc. The device 300 includes the one or more processors 306 that read data from various entities such as memory 304 or I/O components 312. The one or more presentation components 308 present data indications to the user or other device. Exemplary presentation components include a display device, speaker, printing component, vibrating component, etc. The one or more I/O ports 310 allow the device 300 to be logically coupled to other devices including the one or more I/O components 312, some of which may be built in. Illustrative components include a microphone, joystick, gamepad, satellite dish, scanner, printer, wireless device, etc.

The foregoing descriptions of specific embodiments of the present technology have been presented for purposes of illustration and description. They are not intended to be exhaustive or to limit the present technology to the precise forms disclosed, and obviously many modifications and variations are possible in light of the above teaching. The embodiments were chosen and described in order to best explain the principles of the present technology and its practical application, to thereby enable others skilled in the art to best utilize the present technology and various embodiments with various modifications as are suited to the particular use contemplated. It is understood that various omissions and substitutions of equivalents are contemplated as circumstance may suggest or render expedient, but such are intended to cover the application or implementation without departing from the spirit or scope of the claims of the present technology.

While several possible embodiments of the invention have been described above and illustrated in some cases, it should be interpreted and understood as to have been presented only by way of illustration and example, but not by limitation. Thus, the breadth and scope of a preferred embodiment should not be limited by any of the above-described exemplary embodiments.

What is claimed:

1. A fraud-protection computer system comprising:
   a plurality of devices, wherein each device among the plurality of devices comprises:
      a plurality of components, wherein the plurality of components comprises a plurality of device sensors, a plurality of biometrics, and a plurality of device connective components;
   a plurality of third party devices, wherein the plurality of third party devices is connected with each other and the plurality of devices; and
   a fraud detection system comprising:
      one or more processors; and
      a memory coupled to the one or more processors, the memory for storing instructions which, when executed by the one or more processors, cause the one or more processors to perform a method for detection of online advertisement fraud and commercial fraud comprising:
         collecting a first set of data from the plurality of components associated with each device of the plurality of devices in real-time;
         receiving a second set of data associated with each device of a plurality of third party devices in real-time;
         assigning each device of the plurality of third party devices with a unique identity;
         creating a unique device profile for each device of the plurality of devices, wherein the unique device profile stores the corresponding first set of data collected from each device of the plurality of devices;
         analyzing the first set of data and the second set of data to:
            determine that a time period in which the first set of data collected from the plurality of device sensors is zero is longer than a predetermined time period;
            determine a behavior of a plurality of users with a similar finger size, wherein the plurality of users are associated with the plurality of devices, wherein a touch sensor determines the finger size by determining the hardness of a press by a finger and the size of the area pressed, and wherein the behavior of the plurality of users is determined before and after installation of an application, and
            wherein the analyzing is done using a correlation data, the correlation data comprising a positive correlation data and a negative correlation data, wherein the positive correlation data is based on pre-event and post-event data, and wherein the negative correlation data is based on non-human behavior data; and
         detecting the online advertisement fraud and the commerce fraud based on a deviation in the determined behavior of the plurality of users before and after the installation of the application and based on the determination that the time period in which the first set of data collected from the plurality of device sensors is zero is longer than the threshold time period.

2. The fraud-protection computer system as recited in claim 1, wherein the first set of data is data associated with gyroscope sensor, accelerometer sensor, device ID data, IP address data, Bluetooth data, network data, touch sensor data, 3D sensor data, location data, and motion data.

3. The fraud-protection computer system as recited in claim 1, wherein the second set of data is data associated with gyroscope sensor, accelerometer sensor, device ID data, IP address data, Bluetooth data, network data, touch sensor data, 3D sensor data, location data, and motion data of each device of the plurality of third party devices.

4. The fraud-protection computer system as recited in claim 1, wherein the plurality of device sensors comprises of at least one of a gyroscope sensor, an accelerometer sensor, a magnetometer, a proximity sensor, a barometer sensor, a compass, a touch sensor, a GPS sensor and a motion sensor.

5. The fraud-protection computer system as recited in claim 1, wherein the plurality of device biometrics comprises of at least one of fingerprint scanner, 3D sensors, face recognition, voice recognition, retina scanner and iris scanner.

6. The fraud-protection computer system as recited in claim 1, wherein the second set of data is received from each device of the plurality of third party devices to facilitate in the detection of the online advertisement fraud and commerce fraud.

7. The fraud-protection computer system as recited in claim 1, wherein the pre-defined set of data comprises of ideal values that must be maintained for each of the plurality of components associated with each device of the plurality of devices.

8. The fraud-protection computer system as recited in claim 1, wherein the first set of data collected from the plurality of components associated with each device of the plurality of devices is used to create a user profile, wherein the user profile is created in real-time.

9. A computer-implemented method for detection of online advertisement fraud and commerce fraud by a fraud-protection computer system, the computer-implemented method comprising:
 collecting a first set of data from a plurality of components associated with each device of a plurality of devices in real-time, wherein the plurality of components comprises a plurality of device sensors, a plurality of device biometrics, and a plurality of device connectivity components;
 receiving a second set of data associated with each device of a plurality of third party devices in real-time, wherein the plurality of third party devices is connected with each other and the plurality of devices;
 assigning each device of the plurality of third party devices with a unique identity;
 creating a unique device profile for each device of the plurality of devices, wherein the unique device profile stores the corresponding first set of data collected from each device of the plurality of devices;
 analyzing the first set of data and the second set of data to:
  determine that a time period in which the first set of data collected from the plurality of device sensors is zero is longer than a predetermined time period;
  determine a behavior of a plurality of users with a similar finger size, wherein the plurality of users are associated with the plurality of devices, wherein a touch sensor determines the finger size by determining the hardness of a press by a finger and the size of the area pressed, and wherein the behavior of the plurality of users is determined before and after installation of an application,
 wherein the analyzing is done using a correlation data, the correlation data comprising a positive correlation data and a negative correlation data, wherein the positive correlation data is based on pre-event and post-event data, and wherein the negative correlation data is based on non-human behavior data; and
 detecting the online advertisement fraud and commerce fraud based on a deviation in the determined behavior of the plurality of users before and after the installation of the application and based on the determination that the time period in which the first set of data collected from the plurality of device sensors is zero is longer than the threshold time period.

10. The computer-implemented method as recited in claim 9, wherein the first set of data is data associated with gyroscope sensor, accelerometer sensor, device ID data, IP address data, Bluetooth data, network data, touch sensor data, 3D sensor data, location data, and motion data.

11. The computer-implemented method as recited in claim 9, wherein the second set of data is data associated with gyroscope sensor, accelerometer sensor, device ID data, IP address data, Bluetooth data, network data, touch sensor data, 3D sensor data, location data, and motion data of each device of the plurality of third party devices.

12. The computer-implemented method as recited in claim 9, wherein the plurality of device sensors comprises of at least one of a gyroscope sensor, an accelerometer sensor, a magnetometer, a proximity sensor, a barometer sensor, a compass, a touch sensor, a GPS sensor and a motion sensor.

13. The computer-implemented method as recited in claim 9, wherein the plurality of device biometrics comprises of at least one of one of fingerprint scanner, 3D sensors, face recognition, voice recognition, retina scanner and iris scanner.

14. The computer-implemented method as recited in claim 9, wherein the second set of data is received from each device of the plurality of third party devices to facilitate in the detection of the online advertisement fraud and commerce fraud.

15. The computer-implemented method as recited in claim 9, wherein the pre-defined set of data comprises of ideal values that must be maintained for each of the plurality of components associated with each device of the plurality of devices.

16. A non-transitory computer-readable storage medium encoding computer executable instructions that, when executed by at least one processor, performs a method for detection of online advertisement fraud and commerce fraud, the method comprising:
 collecting, at a computing device, a first set of data from a plurality of components associated with each device of a plurality of devices in real-time, wherein the plurality of components comprises a plurality of device sensors, a plurality of device biometrics and a plurality of device connectivity components;
 receiving, at the computing device, a second set of data associated with each device of a plurality of third party devices in real-time, wherein the plurality of third party devices is connected with each other and the plurality of devices;
 assigning, at the computing device, each device of the plurality of third party devices with a unique identity;
 creating, at the computing device, a unique device profile for each device of the plurality of devices, wherein the unique device profile stores the corresponding first set of data collected from each device of the plurality of devices;
 analyzing, at the computing device, the first set of data and the second set of data to:
  determine that a time period in which the first set of data collected from the plurality of device sensors is zero is longer than a predetermined time period;
  determine a behavior of a plurality of users with a similar finger size, wherein the plurality of users are associated with the plurality of devices, wherein a touch sensor determines the finger size by determining the hardness of a press by a finger and the size of the area pressed, and wherein the behavior of the plurality of users is determined before and after installation of an application, and
 wherein the analyzing is done using a correlation data, the correlation data comprising a positive correlation data and a negative correlation data, wherein the positive correlation data is based on pre-event and post-event data, and wherein the negative correlation data is based on non-human behavior data; and
 detecting the online advertisement fraud and commerce fraud based on a deviation in the determined behavior of the plurality of users before and after the installation of the application and based on the determination that the time period in which the first set of data collected from the plurality of device sensors is zero is longer than the threshold time period.

* * * * *